(12) United States Patent
Masuda et al.

(10) Patent No.: US 6,400,556 B1
(45) Date of Patent: Jun. 4, 2002

(54) SOLID ELECTROLYTIC CAPACITOR AND METHOD OF FABRICATING THE SAME

(75) Inventors: Yoji Masuda, Uji; Tsuyoshi Yoshino, Kameoka, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/658,666

(22) Filed: Sep. 8, 2000

(30) Foreign Application Priority Data

Sep. 10, 1999 (JP) .......................................... 11-257024

(51) Int. Cl.$^7$ ................................................ H01G 9/00
(52) U.S. Cl. ....................... 361/523; 361/433; 361/311; 361/509; 361/511; 361/323
(58) Field of Search ................................ 361/523, 433, 361/311, 273, 274.1, 312, 323, 504, 540, 509, 511

(56) References Cited

U.S. PATENT DOCUMENTS

| | | | | |
|---|---|---|---|---|
| 3,789,274 A | * | 1/1974 | Pfister et al. ................ | 317/230 |
| 3,855,505 A | * | 12/1974 | Karlik, Jr. et al. .......... | 317/230 |
| 4,017,773 A | * | 4/1977 | Cheseldine ................ | 361/433 |
| 4,105,513 A | * | 8/1978 | Nishino et al. ............... | 204/38 |
| 5,036,434 A | * | 7/1991 | Kobayashi .................. | 361/540 |
| 5,140,502 A | * | 8/1992 | Kudoh et al. ................ | 361/540 |
| 5,223,120 A | * | 6/1993 | Kojima et al. .............. | 205/317 |
| 5,329,421 A | * | 7/1994 | Kuriyama .................... | 361/534 |
| 5,583,740 A | * | 12/1996 | Fujino ........................ | 361/534 |
| 5,608,602 A | * | 3/1997 | Kuriyama .................... | 361/534 |
| 5,729,424 A | * | 3/1998 | Sharp et al. ................. | 361/273 |
| 6,188,566 B1 | * | 2/2001 | Aoyama ..................... | 351/534 |

FOREIGN PATENT DOCUMENTS

JP           405159988          *   6/1993

* cited by examiner

*Primary Examiner*—Dean A. Reichard
*Assistant Examiner*—Nguyen Ha
(74) *Attorney, Agent, or Firm*—Parkhurst & Wendel, L.L.P.

(57) ABSTRACT

A solid electrolytic capacitor minimized in both equivalent serial resistance (ESR) and equivalent serial inductance (ESI) by eliminating redundant space created by its electrode is presented. The solid electrolytic capacitor includes a capacitor element including mainly of a positive electrode body, having a positive electrode lead embedded therein, and made of any form of a valve metal, such as a net, a sheet, a foil, and modifications thereof with a rough surface; a positive electrode terminal connected to the positive electrode lead; a negative electrode terminal connected to a negative electrode layer; and a housing resin coated by molding. This improves the installation efficiency of the capacitor element, and contributes to the small, thin structure of the solid electrolytic capacitor.

9 Claims, 9 Drawing Sheets

FIG. 9

| | Electrode Figure | Thickness of Electrode (μm) | Diameter of Primary Particle (μm) | Nominal CV Value | Solid Electrolyte | Number of Layers | Capacitance Achievement Rate (%) | Capacitance (μF) | ESR (mΩ) |
|---|---|---|---|---|---|---|---|---|---|
| Example 1 | Sheet | 300/sheet Total 1,200 | 0.5 | 40,000 | Manganese Dioxide | 4 | 98 | 205 | 25 |
| Example 2 | Sheet | 300/sheet Total 1,200 | 0.3 | 80,000 | Manganese Dioxide | 4 | 95 | 345 | 30 |
| Example 3 | Sheet | 100/sheet Total 1,000 | 0.1 | 150,000 | Manganese Dioxide | 2 | 95 | 500 | 15 |
| Example 4 | Sheet | 300/sheet Total 1,200 | 0.5 | 40,000 | Polypyrrole | 4 | 98 | 205 | 6 |
| Example 5 | Sheet | 300/sheet Total 1,200 | 0.3 | 80,000 | Polypyrrole | 4 | 95 | 345 | 8 |
| Example 6 | Sheet | 100/sheet Total 1,000 | 0.1 | 150,000 | Polypyrrole | 8 | 95 | 500 | 4 |
| Comparison 1 | Block | 1,400 | 0.5 | 40,000 | Manganese Dioxide | 1 | 90 | 220 | 100 |
| Comparison 2 | Block | 1,400 | 0.5 | 40,000 | Polypyrrole | 1 | 80 | 195 | 25 |
| Comparison 3 | Block | 1,400 | 0.1 | 150,000 | Manganese Dioxide | 1 | 30 | 275 | 500 |

SOLID ELECTROLYTIC CAPACITOR AND METHOD OF FABRICATING THE SAME

FIELD OF THE INVENTION

The present invention relates to a solid electrolytic capacitor for use in an electronic apparatus, and a method of fabricating the same.

BACKGROUND OF THE INVENTION

In general, electrolytic capacitors for use in the secondary side of a power supply circuit, or with the CPU of a personal computer have been desired for decreased dimensions and increased capacitance, as well as minimizing both the equivalent serial resistance (ESR) and the equivalent serial inductance(ESL).

FIG. 10 illustrates the typical structure of a conventional chip solid electrolytic capacitor. More specifically, capacitor element 26 has a positive electrode 20 made of a valve metal in which positive electrode lead 21 is embedded and connected at its proximal end with dielectric oxide film 23, electrolyte layer 24, and negative electrode layer 25 in a sequence. Positive electrode lead 21 of capacitor element 26 is welded to external positive electrode terminal 27, while negative electrode layer 25 is connected by conductive adhesive 28 to external negative electrode terminal 29. Capacitor element 26 and its joints are protected with resin coating 30 shaped by mold forming. External positive electrode terminal 27 and external negative electrode terminal 29, projecting outwardly from opposite ends of resin coating 30, are folded down to extend vertically along the surface of resin coating 30 and then horizontally along the bottom side of resin coating 30, whereby the shape of a chip solid electrolytic capacitor can be determined.

To improve the productivity of such capacitors, a method of modifying a solid of the chip into a wafer form is disclosed in Japanese Patent (Publication No. 8-31696).

Recently, for minimizing ESR, a solid electrolytic capacitor employing, as the solid electrolyte, a functional polymer which is remarkably higher in electric conductivity than a conventional material or manganese dioxide has been proposed.

The above mentioned conventional chip solid electrolytic capacitor however has a considerable size of dead space created by the feed-out region and the folded leads at the joints between positive electrode lead 21 and external positive electrode terminal 27 and between negative electrode lead 25 and external negative electrode terminal 29 in capacitor element 26. Accordingly, the installation of capacitor element 26 will hardly be efficient, hence making the chip capacitor of favorably minimized dimensions much difficult. The feed-out of positive electrode 20 is connected by a point to positive electrode lead 21. This may increase the resistance to the positive electrode output, hence increasing ESR of the conventional chip solid electrolytic capacitor.

Alternatively, a small-sized, large-capacitance chip solid electrolytic capacitor employs traditionally a high capacitance/voltage (CV) powder of valve metal. The high CV powder is increased in the actual surface area by reducing the diameter of each primary particle. This increases the electrostatic capacitance per unit volume, but decreases mass of bubbles in the particles after shaping and sintering. Accordingly, when the electrostatic capacitance is fed out from a solid electrolyte layer after the development of an oxide film, the resistance of the solid electrolyte layer increases and ESR thus increases in theory. Also, as its impregnation of the solid electrolyte solution is relatively low, a capacitance achievement rate, which is expressed by a ratio of the electrostatic capacitance of a liquid electrolyte to the electrostatic capacitance of a solid electrolyte, may possibly be declined.

Moreover, as the positive electrode of such a conventional capacitor is a solid material, its productivity will remain low. Even the high CV powder may fail to demonstrate its advantage in increasing a capacitance and thus hardly minimize ESR.

SUMMARY OF THE INVENTION

It is an object of the present invention to provide a solid electrolytic capacitor in which the capacitor element has improved volumetric installation efficiency, hence minimizing the overall thickness and lowering the equivalent serial resistance (ESR).

The solid electrolytic capacitor according to the present invention includes a capacitor element which comprises:

(a) a positive electrode lead made of a valve metal in any form selected from a net, a sheet, a foil, and their modification with rough surface;

(b) a positive electrode body which is fabricated by forming and sintering a desired shape of the valve metal and which is arranged for the positive electrode lead to be embedded with one end exposed to the outside; and (c) a dielectric oxide film and a negative electrode layer provided on the surface of the positive electrode body.

The solid electrolytic capacitor further comprises a positive electrode terminal connected to the exposed end of the positive electrode lead extending from the capacitor element, a negative electrode terminal connected to the negative electrode layer, and an insulating housing resin covering entirely the capacitor element with the positive electrode terminal and the negative electrode terminal partially exposed to the outside.

The capacitor is consequently decreased in thickness while eliminating redundant of the space created by the feed-out for external connection. As the charge feed-out distance between the positive electrode and the negative electrode is minimized, the equivalent serial resistance pertinent to the chip solid electrolytic capacitor can be lowered.

BRIEF DESCRIPTION OF THE DRAWINGS

FIG. 9 a table shows specification for example and comparison capacitor.

DETAILED DESCRIPTION OF THE PREFERRED EMBODIMENTS

Embodiment 1

Figure 1:
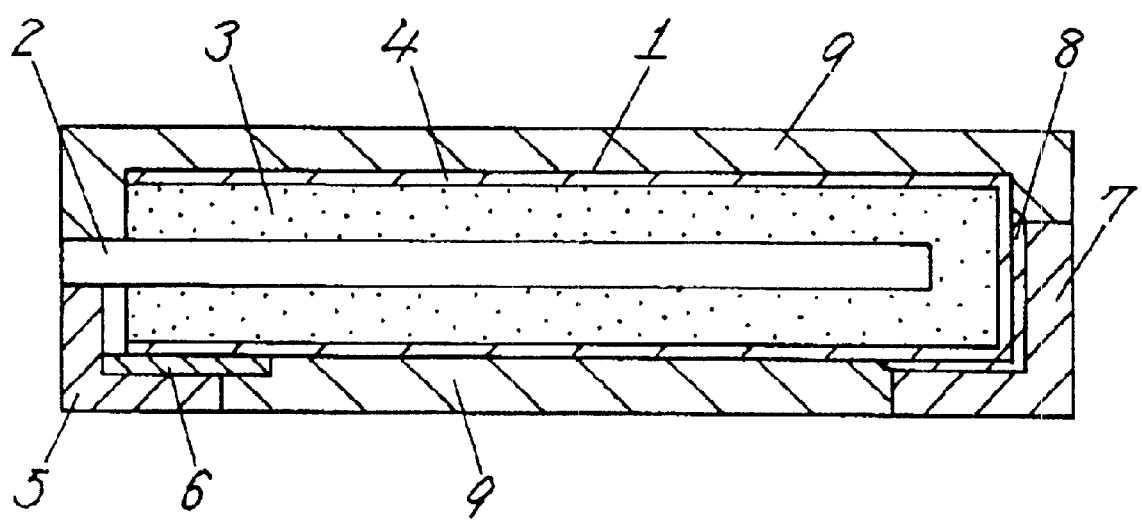
FIG. 1 is a cross sectional view showing a structure of a chip slid electrolytic capacitor of embodiment 1 of the present invention.
Figure 2:
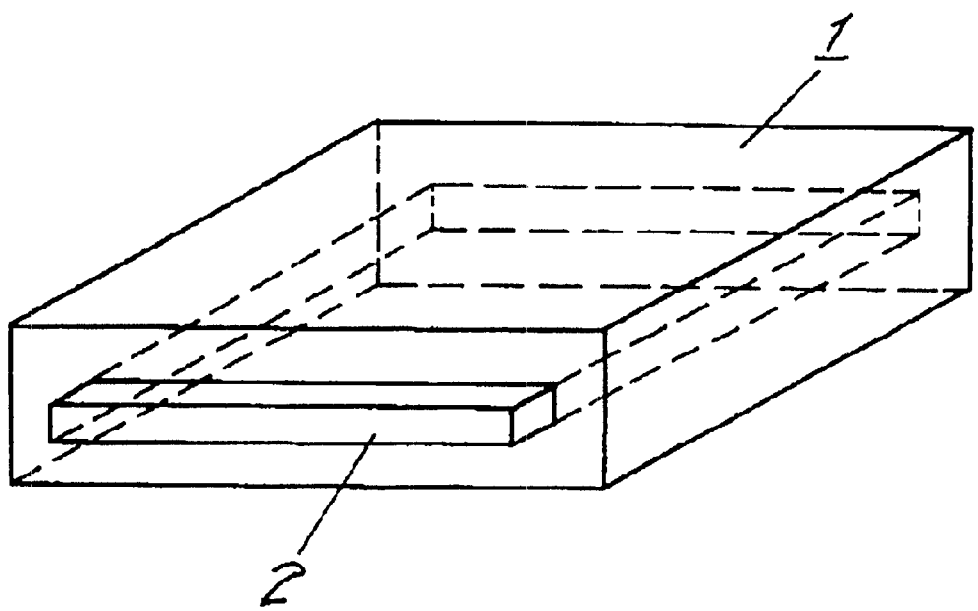
FIG. 2 is a perspective view showing a capacitor element in the chip solid electrolytic capacitor of embodiment 1.

FIG. 1 is a cross sectional view showing a structure of a chip solid electrolytic capacitor of embodiment 1 of the present invention. FIG. 2 is a perspective view of a capacitor element used in the capacitor. Capacitor element 1 comprises:

positive electrode lead 2 made of a valve metal in any form selected from a net, a sheet, a foil, and their modification with a rough surface by etching;

positive electrode body 3 which is fabricated by sintering with a desired shape of the valve metal shaped from its powder form and which embeds positive electrode lead 2 exposed at one end; and a dielectric oxide film, an electrolyte layer (both not shown), and negative electrode layer 4 deposited over the surface of positive electrode body 3, in this order.

Positive electrode terminal 5 is joined at one end to the exposed end of positive electrode lead 2 by laser welding or the like. Insulating material 6 is deposited between positive electrode terminal 5 and capacitor element 1. Conductive adhesive 8 is used for bonding negative electrode terminal 7 to negative electrode layer 4 of capacitor element 1. Capacitor element 1 is entirely coated with casing resin 9 while positive electrode terminal 5 and negative electrode terminal 7 are partially exposed to the outside.

In this arrangement, the positive electrode feed-out is implemented by surface contact with positive electrode lead 2 of a net, a sheet, or a foil form, but not by point or line contact with a wire lead, as in the prior art. This significantly decreases the resistance of the electrode feed-out. Due to a combination of positive electrode lead 2 and its connected feed-out, capacitance element 1 can be minimized in thickness with its feed-out path shortened, hence lowering ESR.

While positive electrode lead 2 is made of a valve metal in any form selected from a net, a sheet, a foil, and their rough surfaced form in this embodiment, it may be a punching metal.

Embodiment 2

Figure 3:
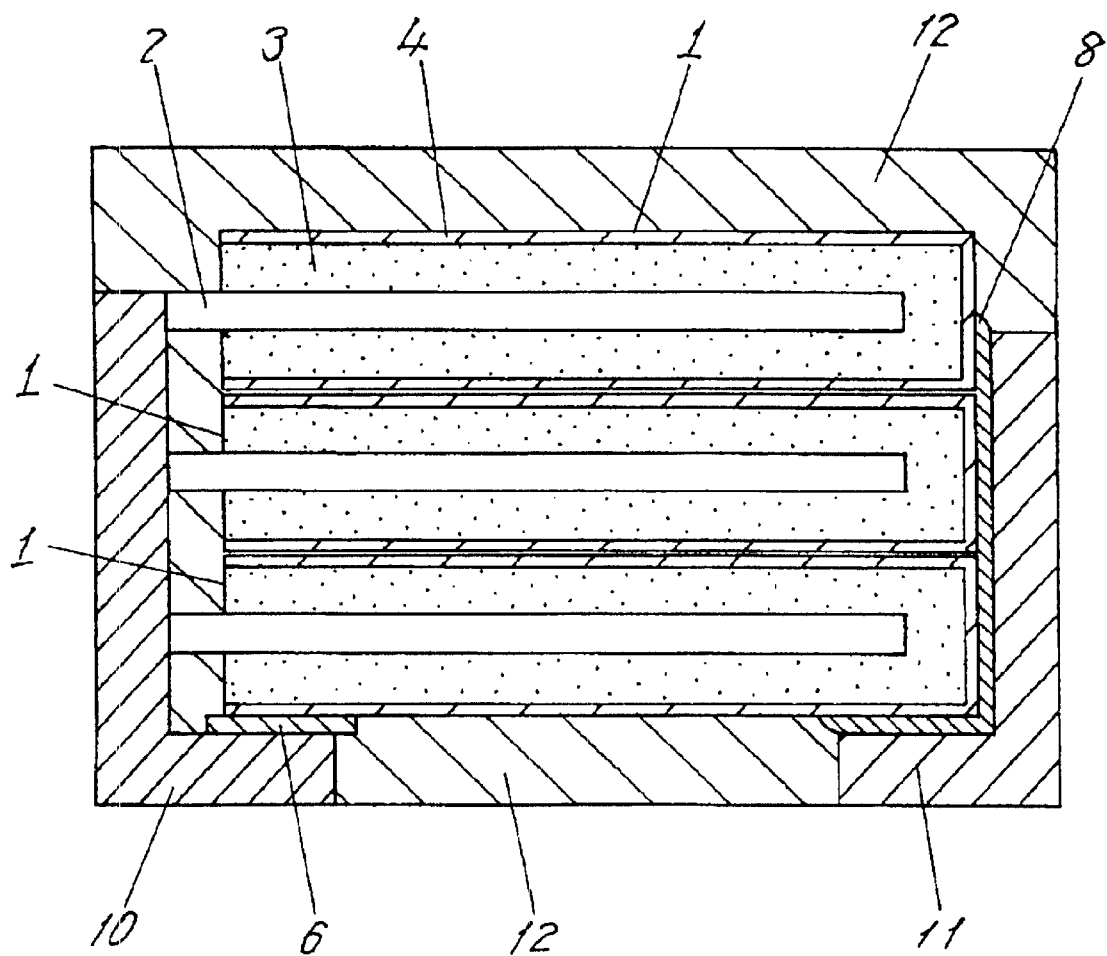
FIG. 3 is a cross sectional view showing a structure of a chip solid electrolytic capacitor of embodiment 2 of the present invention.

FIG. 3 is a cross sectional view showing a structure of a chip solid electrolytic capacitor of embodiment 2 of the present invention. The capacitor of this embodiment comprises three of the chip solid electrolytic capacitors of embodiment 1 placed one over the other. Positive electrode lead 2 is embedded in each capacitor element 1. Three of capacitor elements 1 identical to that of embodiment 1 are stacked in layers. Positive electrode terminal 10 is joined by laser welding or the like to each of exposed ends of positive electrode leads 2 extending from their corresponding capacitor elements 1. Insulating material 6 is sandwiched between the positive electrode terminal and the lowest capacitor element 1. Negative electrode terminal 11 is bonded by conductive adhesive 8 to negative electrode layer 4 of each capacitor element 1. Three capacitor elements 1 are entirely coated with casing resin 12, while positive electrode terminal 10 and negative electrode terminal 11 are partially exposed to the outside.

In the chip solid electrolytic capacitor of this embodiment, capacitor elements 1 are favorably placed one over the other because they are thin. Accordingly, the chip solid electrolytic capacitor can be increased in the capacitance while having low ESR without difficulty. The present invention is not limited to three of capacitor elements 1 illustrated in this embodiment and any desired number of capacitor elements 1 may be used with equal success depending on the specifications and size of a finished product.

Embodiment 3

Figure 4:
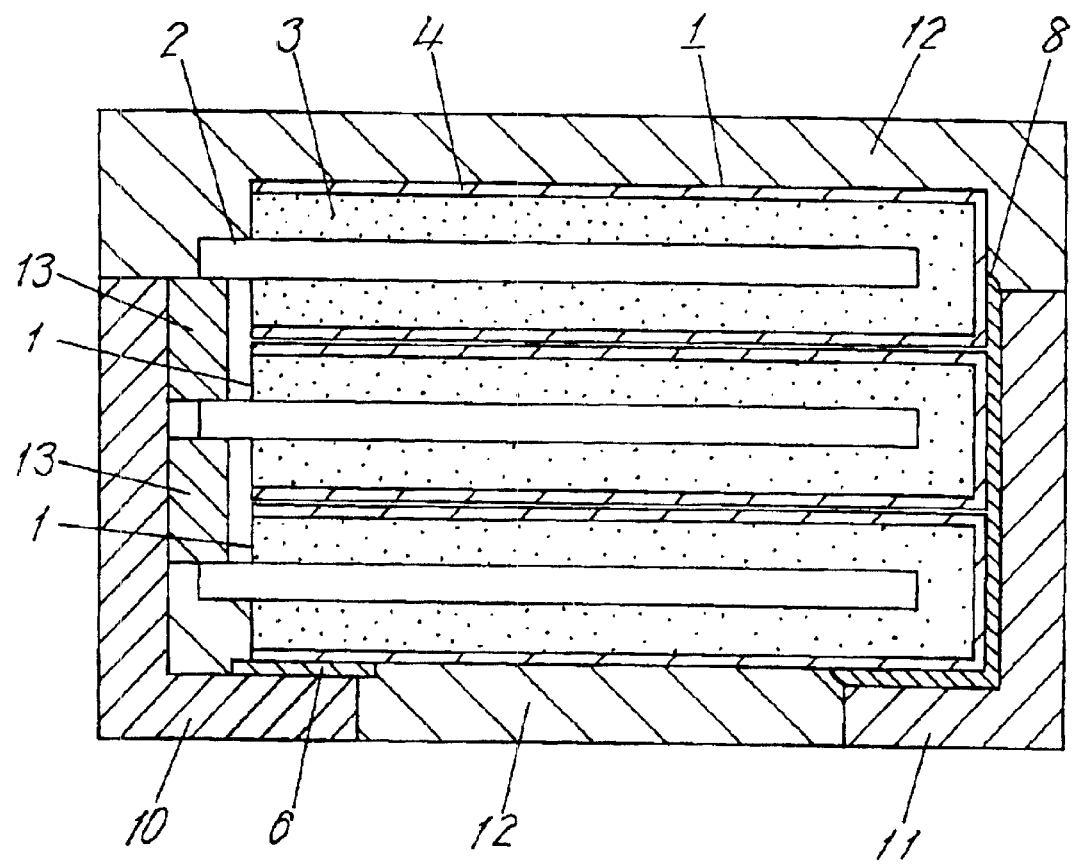
FIG. 4 is a cross sectional view showing a structure of a chip solid electrolytic capacitor of embodiment 3 of the present invention.

FIG. 4 is a cross sectional view showing a structure of a chip solid electrolytic capacitor of embodiment 3 of the present invention. The chip solid electrolytic capacitor of this embodiment differs from that of embodiment 2 by the joining of each positive electrode lead to the positive electrode terminal. As the other arrangement is identical to that of embodiment 2, the common components are denoted by the same numerals as those of embodiment 2 and will be explained in no more detail. The above different feature or joining is only described.

As shown in FIG. 4, positive electrode joining member 13 is disposed alternately with respective positive electrode leads 2 of three capacitor elements 1 placed one over the other. Positive electrode leads 2 are thus connected by positive electrode joining member 13 to positive electrode terminal 10.

As a result, positive electrode lead 2 is more securely joined with positive electrode terminal 10 and their joining reliability can thus be improved. Simultaneously, the electrode feed-out is implemented by surface contact, but not by point contact. While the resistance of the electrode feed-out is reduced, the inductive reactance at high frequencies can consequently be minimized.

The present invention is not limited to the separate provision of positive electrode joining member 13 in this embodiment, but positive electrode joining member 13 may be formed integral with positive electrode terminal 10 at the state shown in FIG. 4.

Embodiment 4

Embodiment 4 of the present invention will be described in the form of a solid electrolytic capacitor using tantalum as the valve metal, referring to the relevant drawings.

Figure 5:
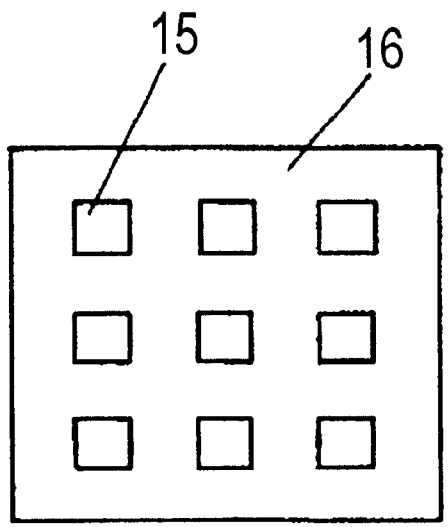
FIG. 5 is a plan view showing an electrode material for a solid electrolytic capacitor of embodiment 4 of the present invention.

FIG. 5 is a plan view of an electrode material for the solid electrolytic capacitor of Embodiment 4. A group of tantalum slurry coatings of a desired size are printed on tantalum foil 14 and sintered to produce electrode layers 15.

As the electrode material for the solid electrolyte capacitor has a sheet-like shape, a plurality of the electrode layers are produced on its surface. This allows a plurality of electrode layers to be formed as thin films at one time from a high CV powder material being before subjected to the sintering, hence contributing to increased of the productivity of a solid electrolyte.

Figure 6:
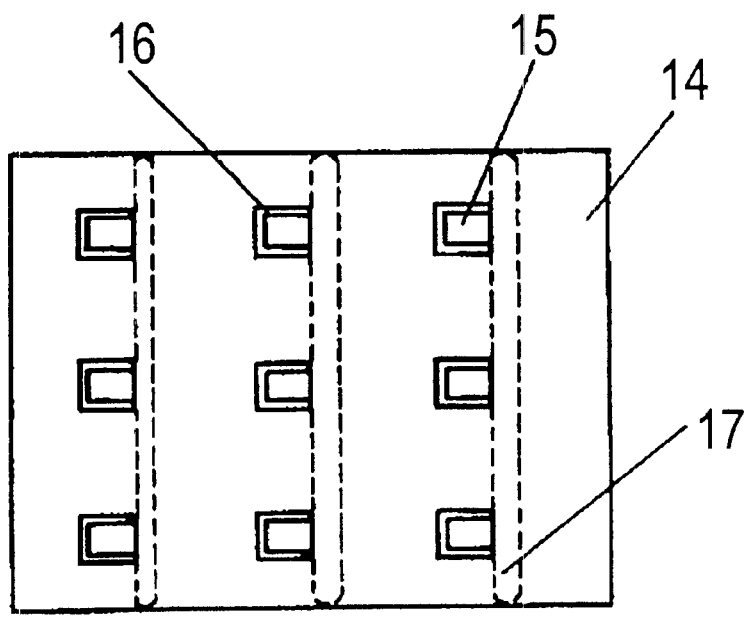
FIG. 6 is a plan view of the solid electrolytic capacitor based on the electrode material shown in FIG. 5.

FIG. 6 is a plan view of the solid electrolytic capacitor fabricated from the electrode material shown in FIG. 5. A punched-out slot 16 is provided at the three sides of electrode layer 15, while the other side is masked with masking 17 for the positive electrode lead. Electrode layer 15 is then anodized to develop a solid electrolyte layer and a negative electrode layer.

This permits the electrode layer to be readily processed at its side edges, which are troubles once in a traditional process of producing a sheet electrode material, as well as its surfaces. The characteristic such as leak current thus improves dramatically as compared with the separation after anodization.

Figure 7:
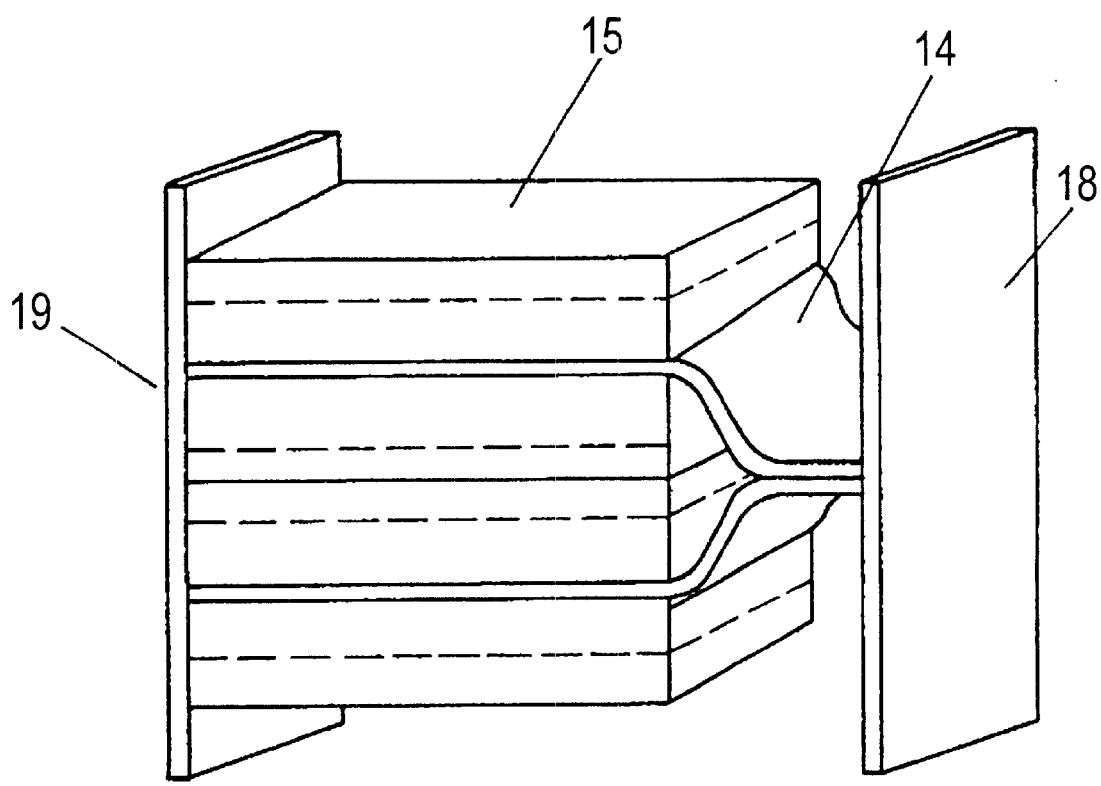
FIG. 7 is a perspective view showing a solid electrolytic capacitor comprising a plurality of the solid electrolytic capacitors shown in FIG. 6 placed one over the other.

FIG. 7 illustrates a finished form of the solid electrolytic capacitor having a number of solid electrolytic capacitors, shown in FIG. 6, placed one over the other. More specifically, masking 17 in the electrode material with the negative electrode layer developed, shown in FIG. 6, are then removed and replaced by a tantalum foil. A number of the electrode materials are placed one over the other, joined with a positive electrode, and separated into pieces. Tantalum foils 14 are connected to positive electrode terminal 18 by laser welding or the like. As electrode layers 15, having negative electrode layers, are joined with negative electrode terminal 19, a solid electrolyte element is completed. Finally, the solid electrolyte element is housed with a resin molding (not shown) to complete the solid tantalum electrolytic capacitor.

As the electrode materials are placed one over the other, the resistances of the electrodes are connected in parallel and ESR of the capacitor is declines, to a level determined by division by the number of the electrode materials. Also, the electrostatic capacitance of the capacitor is the sum of those of the electrode materials, and thus increases as of a large capacitance type.

Figure 8:
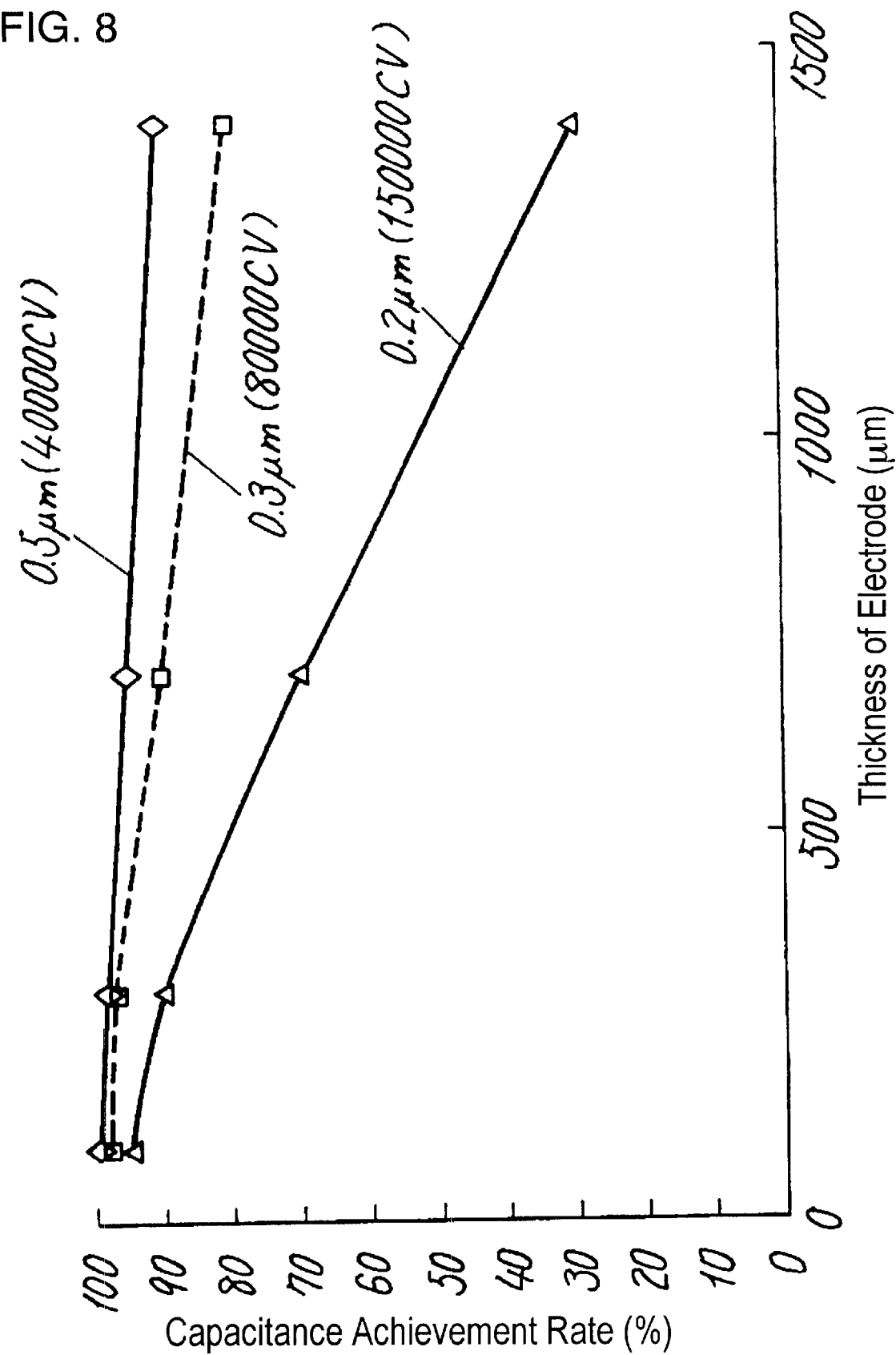
FIG. 8 is a characteristic diagram showing the relationship between the thickness of an electrode layer and the capacitance achievement rate over the average diameters of particles.
Figure 10:
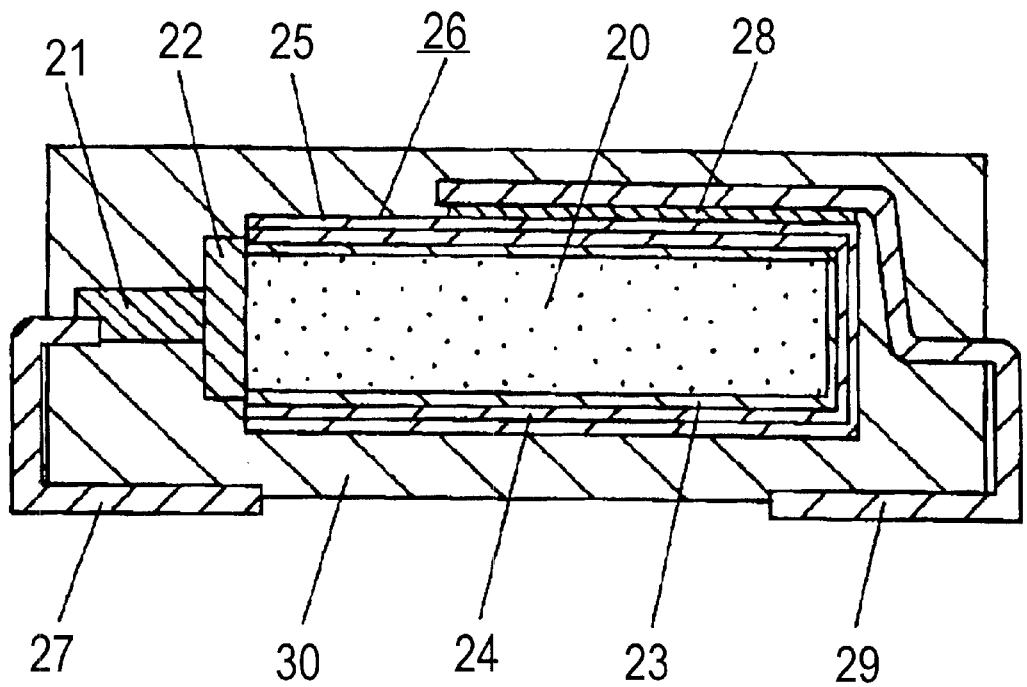
FIG. 10 is a cross sectional view showing an arrangement of a conventional chip solid electrolytic capacitor.

FIG. 8 shows a change of the capacitance achievement rate with the relationship between the thickness of electrode layer 15 and the average diameter of primary particles of tantalum powder. The smaller the particle diameter, or the greater the thickness of the electrode layer, the smaller the achievement rate. For example, with an ultra-high CV powder, of which the CV value is nominally 150,000 and the average particle diameter is 0.2 $\mu$m, the thickness of the electrode layer is not higher than 300 $\mu$m for increasing the achievement rate to 90%. In comparison, when a CV powder has an average particle diameter of 0.3 $\mu$m and a CV value of 80,000, the achievement rate declines to below 80% with a thickness of 1,400 $\mu$m, which thickness of a formed piece. Accordingly, the capacitor of this embodiment can successfully be increased to a desired level.

The following explain some examples of the solid electrolytic capacitor. While Examples 1 to 6 employ tantalum as the valve material, Comparisons 1 to 3 show how the electrostatic capacitance and ESR of solid electrolytic capacitors vary with the thickness of their electrode layer and the particle diameter of their tantalum powder.

EXAMPLE 1

A tantalum powder having a nominal CV value of 40,000 and an average particle diameter of 0.5 $\mu$m is mixed with an acrylic binder and a solution to have a slurry form. The slurry is coated by printing on a tantalum foil of 25 $\mu$m thick masked with a 300 $\mu$m thick masking which has an array of 4 mm by 3 mm apertures therein for development of the electrode layers, hence preparing an electrode material. The electrode material is then dried at about 120 degree Centigrade to eliminate the solution, heated up to about 500 degree Centigrade to remove the binder, and sintered in a vacuum at about 1,300 degree Centigrade. Each electrode layer on the electrode material is cut through at its three sides while its remaining side, at an edge of the tantalum foil, is masked with a length of heat-resistant tape. The electrode material is anodized at a voltage of 15 V in a phosphoric acid solution to form a dielectric oxide film, then immersed in a manganese nitrate solution, and subjected to thermal decomposition at about 250 degree Centigrade to develop a solid electrolyte layer of manganese dioxide. The solid electrolyte layers are covered with a carbon masking and coated with a silver negative electrode film. After the masking is removed, four of the electrode materials having negative electrode layers are placed one over the other, joined their tantalum foils to one another by laser welding for the positive electrode, and separated into pieces. The tantalum foils at the positive electrode are then connected to a positive electrode terminal while the silver negative electrode layers are connected to a negative electrode terminal. A resultant assembly is housed by molding of an epoxy resin and after an aging process, the solid electrolytic capacitor is completed. The sold electrolytic capacitor is then measured; its electrostatic capacitance at 120 Hz and its ESR at 100 KHz. The capacitance achievement rate is also calculated as shown in FIG. 9.

EXAMPLES 2 AND 3

Capacitors are fabricated by the same manner as of Example 1, except the thickness of the electrode layer and the average diameter of primary particles of the tantalum powder. Their resultant measurements are also shown in FIG. 9.

EXAMPLES 4 TO 6

Capacitors are fabricated by the same manner as of Example 1, except that the solid electrolyte is polypyrrole prepared by immersing it in a pyrrole monomer solution.

Comparison 1

A tantalum powder having an average particle diameter of 0.5 $\mu$m and a nominal CV value of 40,000 is compacted to a piece of 4.0 mm×3.0 mm×1.4 mm with a wire lead embedded therein. The piece is then sintered in a vacuum by the same manner as described above and anodized at a voltage of 15 V in a phosphoric acid solution. The piece is subjected to thermal decomposition in a manganese nitride solution to develop a solid electrolyte layer of manganese dioxide. The solid electrolyte layer is coated with a masking of carbon to form a silver negative electrode layer. The wire lead is connected to a positive electrode terminal while the silver negative electrode layer is connected to a negative electrode terminal. A resultant assembly is then housed by molding of epoxy resin, and after aging process, a comparison example of the solid electrolytic capacitor is completed. The solid electrolytic capacitor is measured; its electrostatic capacitance at 120 Hz and its ESR at 100 kHz. The capacitance achievement rate is also calculated as shown in FIG. 9.

Comparison 2

A capacitor is fabricated by the same manner as Comparison 1, except that the solid electrolyte is polypyrrole. Its resultant measurements are also shown in FIG. 9.

Comparison 3

A capacitor was fabricated by the same manner as Comparison 1, except that the average diameter of primary particles of the tantalum powder was 0.1 $\mu$m. Its resultant measurements are shown in FIG. 9.

As apparent from FIG. 9 showing the comparison between examples and comparisons, the capacitors with the electrode leads of a sheet-like form are much improved in capacitance achievement rate and their multi-layer construction contributes to the successful attenuation of ESR. As apparent from the comparison between examples 1 and 3 or between Comparisons 1 and 3, the electrode material made of the low-CV tantalum power having a large average particle diameter generates a volume loss in a multi-layer structure and thus decreases the electrostatic capacitance. On the contrary, the use of a high-CV powder having a small average particle diameter significantly improves the achievement rate hence allowing the multi-layer structure of the capacitor to provide a larger capacitance.

When polypyrrole is used as the solid electrolyte, its electrical conductivity is as high as lowering the ESR. The chemical polymerization for pyrrole may be difficult with the oxidizing agent having a longer diffusion distance, thus declining the capacitance achievement rate. However, as apparent from the comparison between example 4 and comparison 2, the capacitance achievement rate of the capacitors with the electrode leads of a sheet-like form is much improved and higher than that using manganese dioxide as the solid electrolyte.

As apparent from the comparison between Examples 3 and 6 or Comparisons 1 and 2, the electrostatic capacitance is increased about 2.5 times greater and ESR is decreased to about 15% with the volume of the electrode element remaining substantially unchanged.

While examples are viewed in light of illustrative comparisons, the dimensions of the capacitor elements for installation remain unchanged. The capacitors with the electrode material lead of a sheet-like form employ no wire leads and allow surface contact with tantalum foils, hence contributing to the increase of the capacitor area and thus of the capacitance per size.

As the electrode material of a sheet-like form permits the overall thickness of the capacitor to be reduced as compared with a conventional capacitor, the conductive path generated in bubbles in the solid electrolyte after the sintering process can be shortened. This allows the use of a high-CV powder material without sacrificing the capacitance achievement rate, hence contributing to the large capacitance of the solid electrolytic capacitor.

Moreover, a group of the sheet electrode materials are placed one over the other, successfully lowering ESR pertinent to the solid electrolytic capacitor of which the capacitance can thus be increased.

What is claimed is:

1. A solid electrolytic capacitor comprising:
   a capacitor element including:
      a positive electrode lead of a valve metal having the general configuration of a sheet,
      a positive electrode body fabricated by forming and sintering a desired shape of a valve material powder arranged such that said positive electrode lead is embedded therein with one end exposed,
      a dielectric oxide film formed on a surface of said positive electrode body,
      an electrolyte layer formed on a surface of said dielectric oxide film,
      a negative electrode layer formed on a surface of said electrolyte layer;
      a positive electrode terminal connected directly without intervening conductive elements to said positive electrode lead to have an electrical path length that attenuates an equivalent serial resistance (ECR) thereof;
      a negative electrode terminal connected to said negative electrode layer to have an electrical path length that attenuates an equivalent serial resistance (ECR) thereof; and
   an insulating housing resin encapsulating said capacitor element, wherein said positive electrode terminal and said negative electrode terminal are exposed at least partially to an outside of said housing resin and are disposed on an outer surface of the housing resin.

2. The solid electrolytic capacitor according to claim 1, wherein said positive electrode lead is implemented by any form of the valve metal selected from a net, a sheet, a foil, a rough surfaced net, a rough surfaced sheet, and a rough surfaced foil.

3. The solid electrolytic capacitor according to claim 1, wherein said positive electrode terminal and said negative electrode terminal are folded down to extend along an outer surface of said housing resin.

4. The solid electrolytic capacitor according to claim 1, wherein a plurality of said capacitor elements are placed one over the other.

5. The solid electrolytic capacitor according to claim 4, wherein said positive electrode terminal and said negative electrode terminal are folded down to extend along an outer surface of said housing resin.

6. A solid electrolytic capacitor according to claim 4, further comprising positive electrode joining member for connecting a plurality of said positive electrode leads together with said positive electrode terminal.

7. A solid electrolytic capacitor comprising:
   a positive electrode body of a valve metal having the general configuration of a sheet,
   an electrode layer of a valve metal powder formed on said positive electrode body,
   a dielectric oxide film formed on a surface of said dielectric oxide film,
   an electrolyte layer formed on a surface of said dielectric oxide film, and
   a negative electrode layer formed on a surface of said electrolyte layer;
   a positive electrode terminal connected directly without an intervening conductive element to said positive electrode lead to have an electrical path length that attenuates an equivalent serial resistance (ESR) thereof; and
   a negative electrode terminal connected to said negative electrode layer to have an electrical path length that attenuates an equivalent serial resistance (ESR) thereof.

8. The solid electrolytic capacitor according to claim 7, wherein said electrode layer has a thickness of not greater than 300 $\mu$m.

9. The solid electrolytic capacitor according to claim 7, wherein the valve metal is tantalum and the valve metal powder is a tantalum powder of which an average diameter of primary particles is 0.3 $\mu$m or smaller.

* * * * *

UNITED STATES PATENT AND TRADEMARK OFFICE
CERTIFICATE OF CORRECTION

PATENT NO.     : 6,400,556 B1
DATED          : June 4, 2002
INVENTOR(S)    : Yoji Masuda and Tsuyoshi Yoshino It is certified that error appears in the above-identified patent and that said Letters Patent is hereby corrected as shown below:

<u>Title page,</u>
Item [56], U.S. PATENT DOCUMENTS, "6,188,566" reference, change "351/534" to -- 361/534 --.

Signed and Sealed this

Twenty-fourth Day of June, 2003

JAMES E. ROGAN
*Director of the United States Patent and Trademark Office*